(12) United States Patent
Tamura

(10) Patent No.: US 9,225,873 B2
(45) Date of Patent: Dec. 29, 2015

(54) INFORMATION PROCESSING SYSTEM, INFORMATION PROCESSING APPARATUS, INFORMATION PROCESSING METHOD, AND PROGRAM

(71) Applicant: CANON KABUSHIKI KAISHA, Tokyo (JP)

(72) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/487,995

(22) Filed: Sep. 16, 2014

(65) Prior Publication Data

US 2015/0077802 A1 Mar. 19, 2015

(30) Foreign Application Priority Data

Sep. 18, 2013 (JP) ................................. 2013-193036

(51) Int. Cl.
*G06F 15/00* (2006.01)
*H04N 1/21* (2006.01)
*G06F 3/0484* (2013.01)
*G06F 17/30* (2006.01)
*H04N 1/00* (2006.01)
*H04N 1/32* (2006.01)

(52) U.S. Cl.
CPC ............ *H04N 1/217* (2013.01); *G06F 3/04842* (2013.01); *G06F 17/30091* (2013.01); *G06F 17/30115* (2013.01); *G06F 17/30244* (2013.01); *H04N 1/00244* (2013.01); *H04N 1/00411* (2013.01); *H04N 1/32432* (2013.01); *H04N 2201/0094* (2013.01)

(58) Field of Classification Search
CPC ................ H04N 1/21; H04N 1/00891; H04N 2201/0094
USPC ......................................................... 358/1.16
See application file for complete search history.

(56) References Cited

U.S. PATENT DOCUMENTS

2004/0027601 A1* 2/2004 Ito ..................... G06F 17/30011
 358/1.13
2006/0139680 A1* 6/2006 Okamoto et al. ............ 358/1.14

FOREIGN PATENT DOCUMENTS

JP 2008-072256 A 3/2008

* cited by examiner

*Primary Examiner* — Saeid Ebrahimi Dehkordy
(74) *Attorney, Agent, or Firm* — Canon USA, Inc., IP Division

(57) ABSTRACT

A multifunction peripheral (MFP) for displaying a screen including a list of a part of folders included in a plurality of folders determines to, based on a file stored in a same folder as a folder storing the plurality of folders, display index keys for enabling display of folders corresponding to a specified character out of the plurality of folders (S1002), and displays a screen including the index keys on a display unit.

13 Claims, 18 Drawing Sheets

FIG. 12

1200 FOLDER LIST

| | |
|---|---|
| 1 | Aaron Smith |
| 2 | Abigail Johnson |
| 3 | Andrea Wilson |
| 4 | Andrew Davis |
| 5 | Bentley Taylor |
| 6 | Brody Martin |
| 7 | Brooklyn Lewis |
| 8 | Caroline Walker |
| 9 | Connor Perez |
| 10 | Chloe Hall |
| 11 | David Sanchez |
| 12 | Ethan Adams |
| 13 | Hudson Roberts |
| 14 | Ian Phillips |
| 15 | Makayla Howard |
| 16 | Nathan Reyes |
| 17 | Robert Ross |
| 18 | Sofia Morales |
| 19 | Trinity Gutierrez |
| 20 | Tristan Jenkins |

INFORMATION PROCESSING SYSTEM, INFORMATION PROCESSING APPARATUS, INFORMATION PROCESSING METHOD, AND PROGRAM

BACKGROUND OF THE INVENTION

1. Field of the Invention

The present invention relates to an information processing system capable of displaying a folder list, an information processing apparatus, an information processing method, and program.

2. Description of the Related Art

A conventional scanner apparatus is known, which reads an image on a document to generate image data. The image data generated by the scanner apparatus can be transmitted to an external apparatus (such as a personal computer (PC) and a file server) on a network, and stored in a folder generated in the external apparatus. Further, if a folder is generated in the scanner apparatus in advance, the image data can also be stored in the folder.

It is known that, when specifying an image data storage destination folder, information about folders managed on the side of an external apparatus or within a scanner apparatus is acquired, and a folder list is displayed on a display unit (see Japanese Patent Application Laid-Open No. 2008-072256). Based on the folder list displayed on the display unit, a user of the scanner apparatus can specify any desired folder as an image data storage destination.

If there are many candidates of image data storage destination folders, it is not possible to display all of these folders at one time because of the screen size limitation. In this case, a user who selects a folder needs to scroll the screen displaying only a part of folders until a desired folder appears. This operation is time-consuming.

On the other hand, if index keys to which a specific character is assigned are displayed in the screen, and folders corresponding to a specific character are displayed in response to an index key operation, the user can quickly find a desired folder, thus improving the usability. However, in a case where there are not many folders or where folder names are meaningless (i.e., folders are assigned names not easily selectable by using index keys, for example, enumerations of random signs), displaying index keys having a small usage value will be a waste of the screen area.

SUMMARY OF THE INVENTION

The present invention is directed to providing a mechanism for suitably determining whether index keys are included in the screen for displaying a list of folders.

According to an aspect of the present invention, an information processing system includes a management unit configured to manage a plurality of folders, a display unit configured to display a screen including a list of a part of folders included in the plurality of folders, a determination unit configured to determine to, based on a file stored in a same folder as a folder storing the plurality of folders, display index keys for enabling display of folders corresponding to a specified character out of the plurality of folders, and a display control unit configured to, in a case where the determination unit determines to display the index keys, display the screen including the index keys on the display unit, and to, in a case where the determination unit does not determine to display the index keys, display the screen not including the index keys on the display unit.

Further features of the present invention will become apparent from the following description of exemplary embodiments with reference to the attached drawings.

BRIEF DESCRIPTION OF THE DRAWINGS

FIG. 12 illustrates a folder list according to exemplary embodiments of the present invention.

DESCRIPTION OF THE EMBODIMENTS

Various exemplary embodiments, features, and aspects of the invention will be described in detail below with reference to the drawings.

The following exemplary embodiments do not limit the present invention within the ambit of the appended claims. Not all of the combinations of the features described in the exemplary embodiments are necessarily indispensable to the solutions for the present invention.

Figure 1:
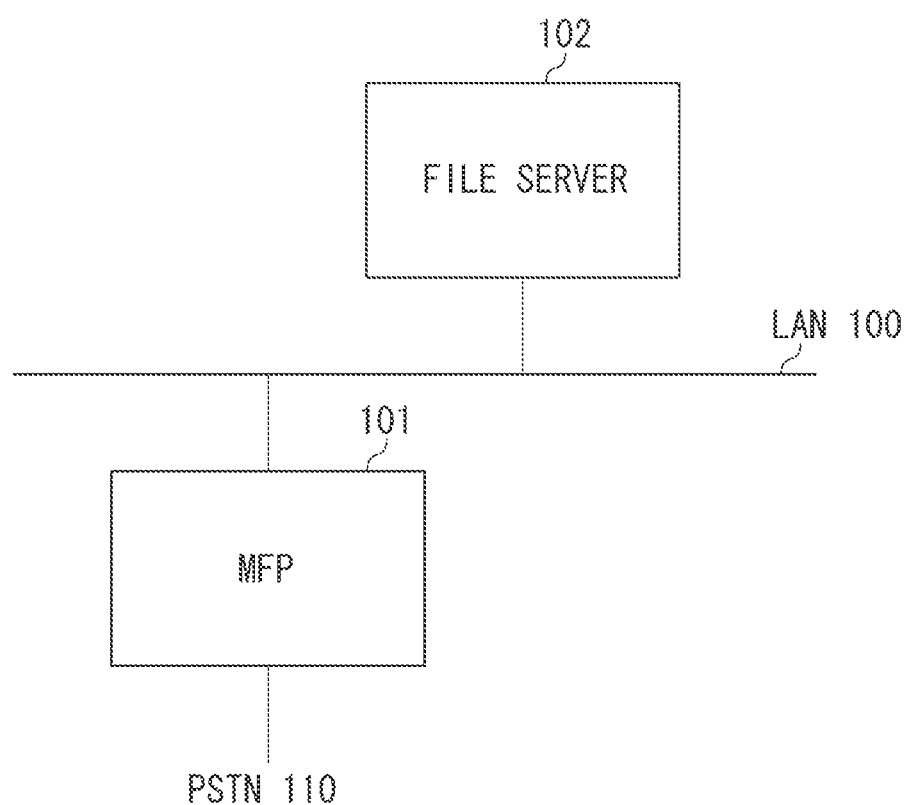
FIG. 1 illustrates an overall configuration of an information processing system according to exemplary embodiments of the present invention.

A first exemplary embodiment of the present invention will be described below. FIG. 1 illustrates an overall configuration of an information processing system. A multifunction peripheral (MFP) 101 and a file server 102 are connected to a local area network (LAN) 100 so that they can communicate with each other. The MFP 101 is an example information processing apparatus. Although the MFP 100 will be described below as an example information processing apparatus, an information processing apparatus may be a PC, a mobile terminal, or any other types of apparatuses as long as it is capable of displaying a list of folders.

The file server 102 is an example external apparatus. Although the information processing system includes the MFP 101 and the file server 102, only the MFP 101 can be referred to as an information processing system. The MFP 101 is also connected to a public switched telephone networks (PSTN) 110, enabling image data facsimile communication with a facsimile apparatus (not illustrated).

Figure 2:
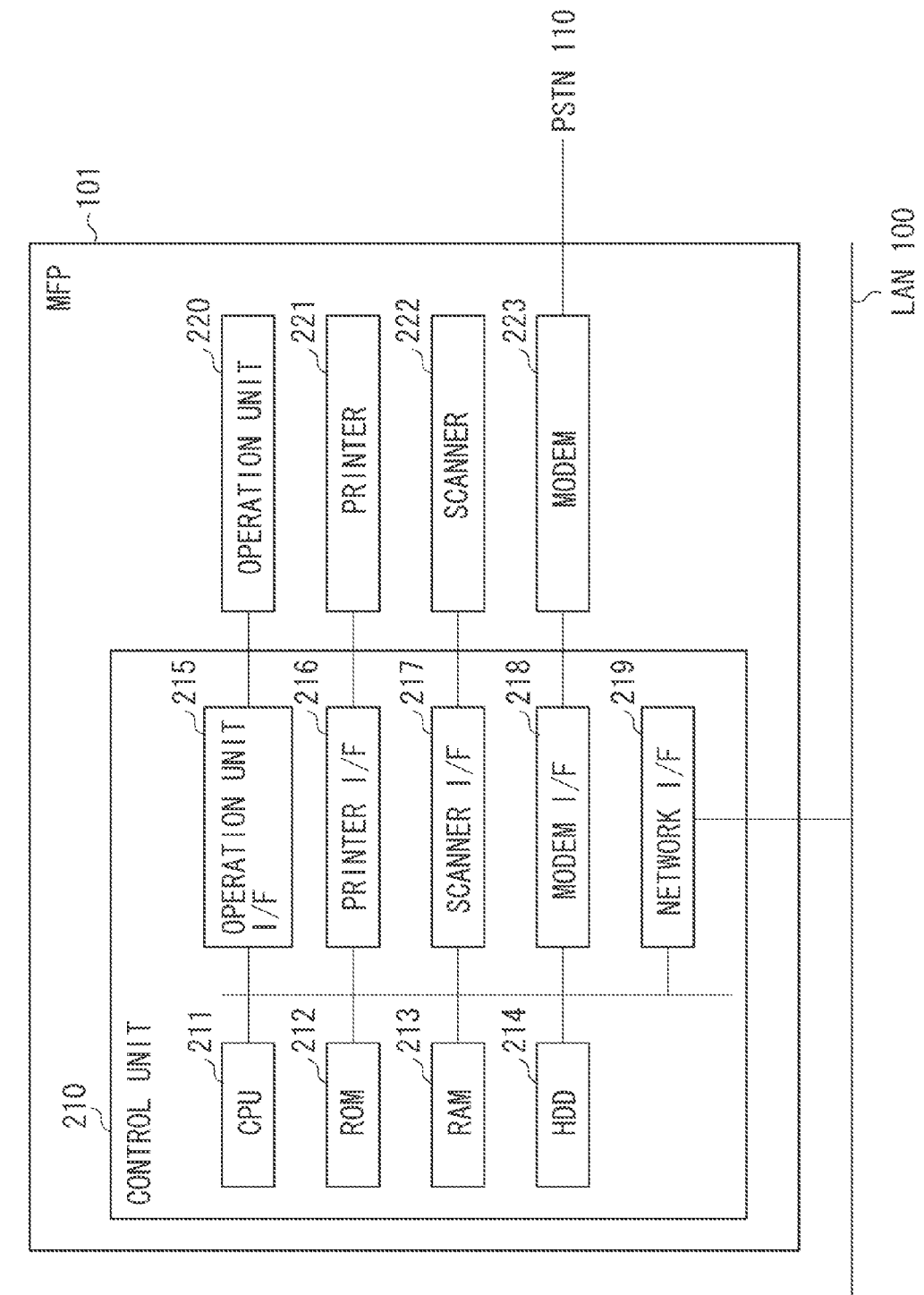
FIG. 2 illustrates a hardware configuration of a multifunction peripheral (MFP) according to exemplary embodiments of the present invention.

FIG. 2 illustrates a hardware configuration of the MFP 101. A control unit 210 including a central processing unit (CPU) 211 controls operations of the entire MFP 101. The CPU 211 reads a control program stored in a read only memory (ROM) 212, and performs various control operations, such as reading, printing, and communication. A random access memory (RAM) 213 is used as a main memory and a temporary storage area such as a work area, for the CPU 211. Although, in the MFP 101, the CPU 211 executes each processing illustrated in flowcharts (described below) by using a memory (the RAM 213 or a hard disk drive (HDD) 214), the configuration is not limited thereto. For example, a plurality of CPUs and a plurality of RAMs or HDDs operate in a collaborating way to execute each processing illustrated in the flowcharts.

The HDD 214 stores image data and various programs. An operation unit I/F 215 connects an operation unit 220 and a control unit 210. The operation unit 220 is provided with a liquid crystal display (LCD) unit having touch-panel functions, and a keyboard. The operation unit 220 serves as a reception unit for receiving an operation, an input, and an instruction from the user.

A printer I/F 216 connects a printer 221 and the control unit 210. Image data to be printed by the printer 221 is transmitted from the control unit 210 to the printer 221 via the printer I/F 216, and is printed on a recording medium by the printer 221.

A scanner I/F 217 connects a scanner 222 and the control unit 210. The scanner 222 reads an image on a document, generates image data, and supplies it to the control unit 210 via the scanner I/F 217. The MFP 101 can transmit the image data generated by the scanner 222 to the file server 102 by using the Web-based Distributed Authoring and Versioning (WebDAV) protocol. Instead of WebDAV, File Transfer Protocol (FTP) and Server Message Block (SMB) can be used.

A modulator-demodulator (modem) I/F 218 connects a modem 223 and the control unit 210. The modem 223 performs image data facsimile communication with a facsimile apparatus (not illustrated). A network I/F 219 connects the control unit 210 (MFP 101) to the LAN 100. The MFP 101 transmits image data and information and receives various types of information to/from an external apparatus (the file server 102) on the LAN 100 via the network I/F 219.

Figure 3:
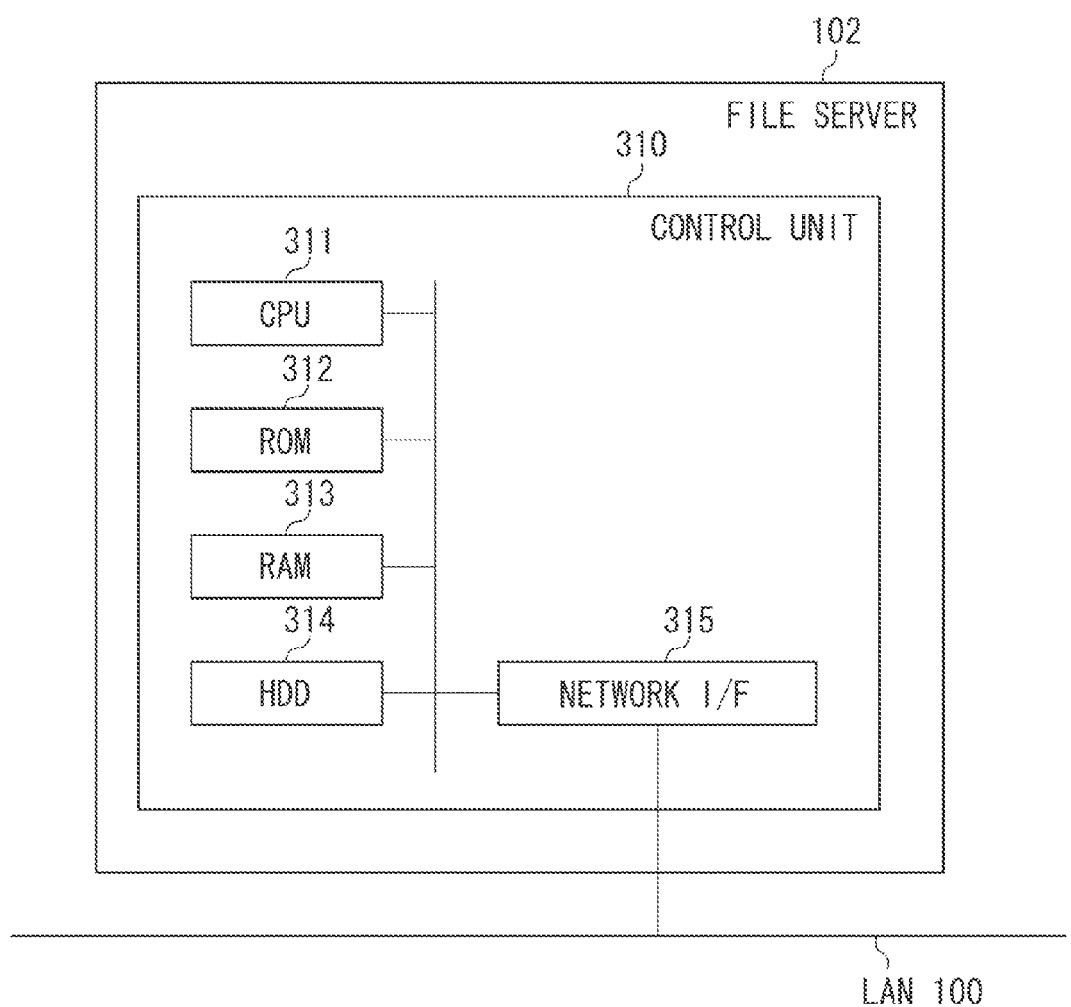
FIG. 3 illustrates a hardware configuration of a file server according to exemplary embodiments of the present invention.

FIG. 3 illustrates a hardware configuration of the file server 102. The control unit 310 including the CPU 311 controls operations of the entire file server 102. The CPU 311 reads a control program stored in the ROM 312, and performs various control processing. A RAM 313 is used as a main memory for the CPU 311, and a temporary storage area, such as a work area. A HDD 314 stores image data and various programs. A plurality of hierarchically managed folders is generated in the HDD 314. The image data transmitted from the MFP 101 can be stored in the folders. Image data stored in the folders can be viewed and operated from a PC (not illustrated) on the LAN 100.

A network I/F 315 connects the control unit 310 (the file server 102) to the LAN 100. The file server 102 transmits and receives various types of information to/from other apparatuses on the LAN 100 via the network I/F 315.

Operations of the information processing system (services provided by using the information processing system) will be described below based on a cram school supporting system as an example. A cram school supporting system refers to a system for improving the efficiency of cram school operations and services in which a large volume of printed paper documents are handled. In particular, the cram school supporting system facilitates operations for reading the above-described documents by using the scanner 222, and uploading them to the file server 102. The cram school supporting system is implemented by using an application called "cram school filing" installed on the side of the MFP 101, and a file system for hierarchically managing a plurality of folders on the side of the file server 102.

Figure 4:
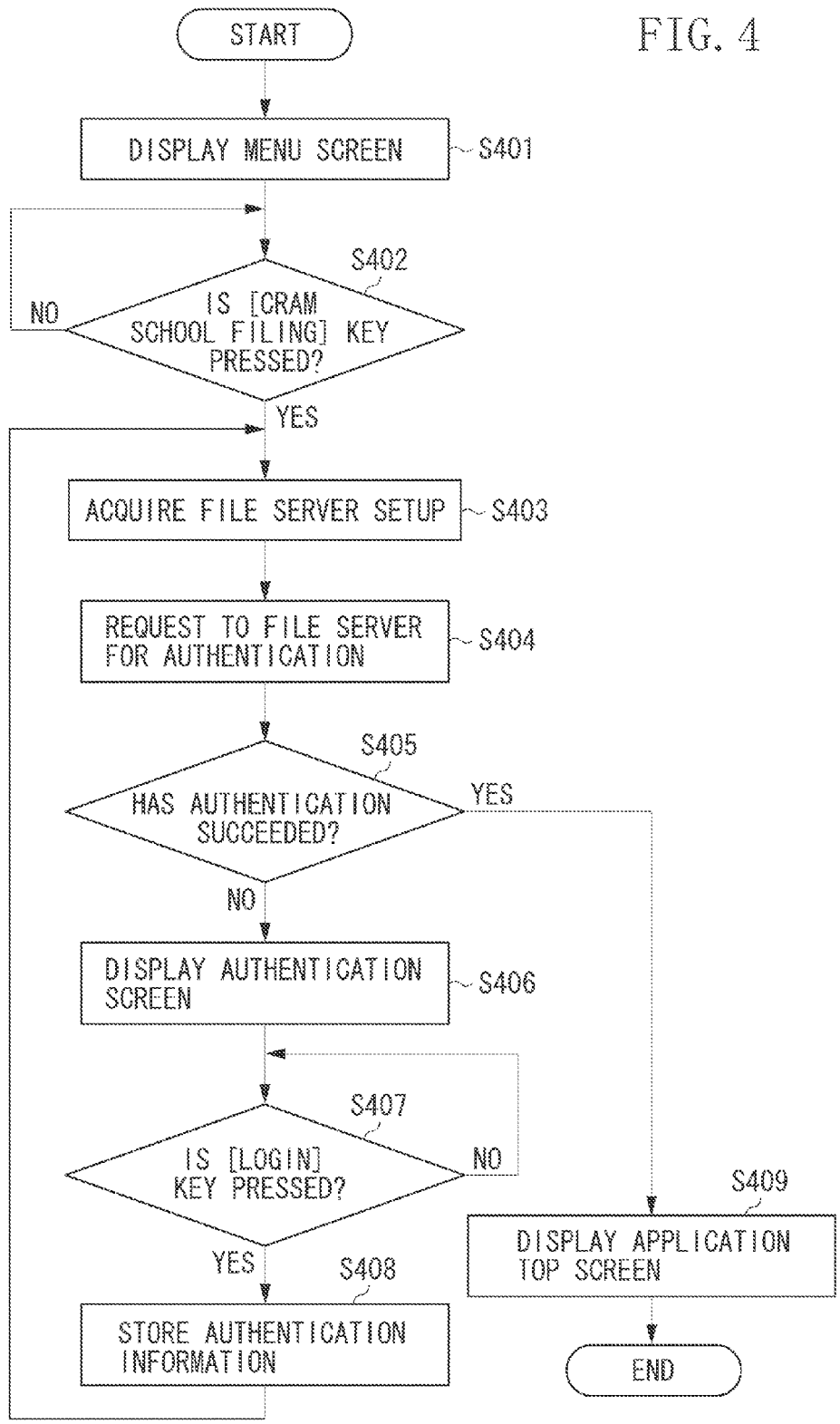
FIG. 4 is a flowchart illustrating operations of the MFP according to exemplary embodiments of the present invention.

FIG. 4 is a flowchart illustrating operations since the MFP 101 is activated until an application top screen 610 of the "cram school filing" is displayed. Each operation (step) of the flowchart illustrated in FIG. 4 is implemented when the CPU 211 of the MFP 101 executes a control program stored in the HDD 214.

Figure 5A:
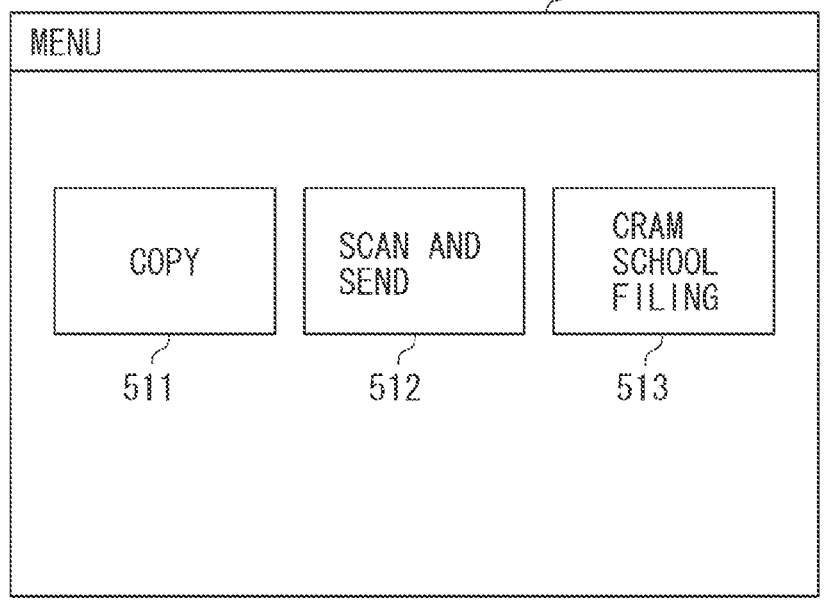
FIGS. 5A and 5B illustrate operation screens of the MFP according to exemplary embodiments of the present invention.

In step S401, the CPU 211 displays a menu screen 510 illustrated in FIG. 5A on the operation unit 220. The menu screen 510 displays a list of functions and applications provided by the MFP 101. A [COPY] key 511 and a [SCAN AND SEND] key 512 illustrated in FIG. 5A are operation keys corresponding to standard functions (native functions) provided by the MFP 101. On the other hand, the [CRAM SCHOOL FILING] key 513 is an operation key corresponding to Java (registered trademark)-based application additionally installed in the MFP 101. The MFP 101 may be provided with other native functions and other applications (not illustrated).

In step S402, the CPU 211 determines whether the [CRAM SCHOOL FILING] key 513 is pressed. When the [CRAM SCHOOL FILING] 513 is determined to be pressed (YES in step S402), the processing proceeds to step S403. On the other hand, when the [CRAM SCHOOL FILING] key 513 is determined to be not pressed (NO in step S402), the CPU 211 waits until the relevant key is pressed. When the [COPY] key 511 or the [SCAN AND SEND] key 512 is pressed, the function corresponding to the pressed key is executed.

In step S403, the CPU 211 acquires a file server setup stored in the HDD 214. The file server setup is provided as a file having the comma-separated value (CSV) or the extended markup language (XML) format which stores information about the file server 102. The file server setup includes information about the host name and the root folder which is a starting point of the folder path of the file server 102. The file server setup further includes authentication information (an identifier (ID) and a password) for logging in the file server 102. It is necessary that each piece of information included in the file server setup has been input in advance by an administrator or a user of the MFP 101 via a file server setup screen displayed on a PC (not illustrated).

In step S404, the CPU 211 requests the file server 102 to authenticate the user based on the file server setup acquired in step S403. When authentication has succeeded, the MFP 101 can access the file server 102. In step S405, the CPU 211 determines whether authentication by the file server 102 has succeeded, and the user has logged therein. When authentication is determined to have succeeded (YES in step S405), the processing proceeds to step S409. On the other hand, when authentication is determined to have failed (NO in step S405), the processing proceeds to step S406.

Figure 5B:
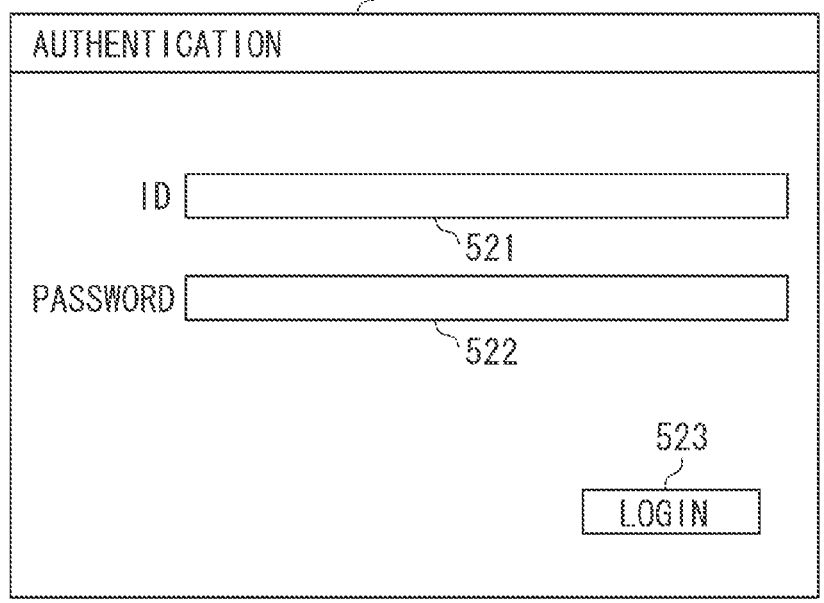

In step S406, the CPU 211 displays an authentication screen 520 illustrated in FIG. 5B on the operation unit 220. When authentication by the file server 102 has failed, the authentication information included in the file server setup may possibly have an error. In this case, therefore, the user is prompted to input authentication information via the authentication screen 520. In step S407, the CPU 211 determines whether the [LOGIN] key 523 is pressed. When it is determined that the [LOGIN] key 523 is pressed (YES in step S407), the processing proceeds to step S408. On the other hand, when it is determined that the [LOGIN] key is not pressed (NO in step S407), the CPU 211 waits until the relevant key is pressed.

In step S408, the CPU 211 stores the authentication information input by the user in the HDD 214, and the processing returns to step S403. Once the processing in step S408 has been performed, it becomes unnecessary for the user to input the authentication information during subsequent login operations. However, the CPU 211 may omit the processing in steps S408 and S403, and alternatively proceed to step S404. After proceeding to step S404 by omitting the processing in steps S408 and S403, the CPU 211 may determine that authentication has succeeded, and store the authentication information in step S405.

Figure 6A:
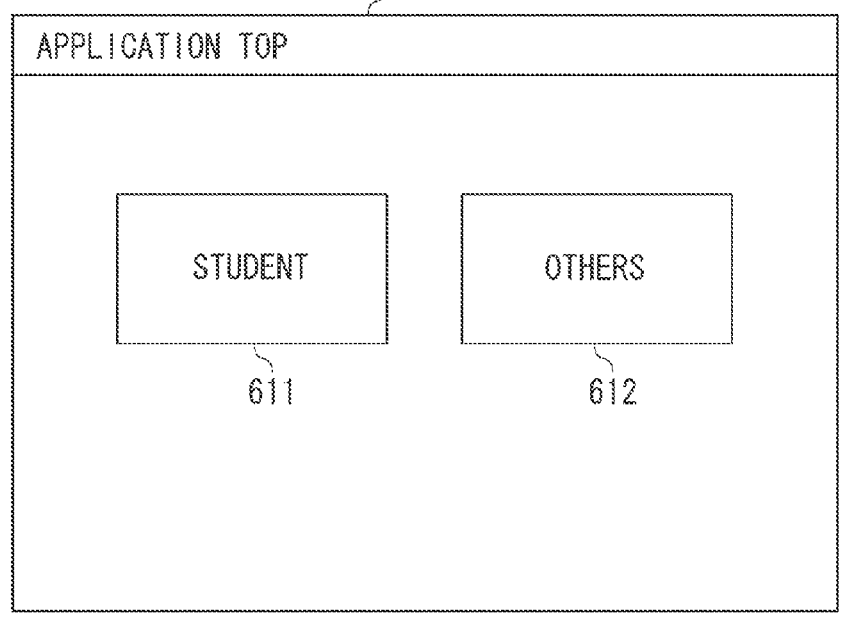
FIGS. 6A and 6B illustrate operation screens of the MFP according to exemplary embodiments of the present invention.

In step S409, the CPU 211 displays the application top screen 610 illustrated in FIG. 6A on the operation unit 220. The application top screen 610 displays a [STUDENT] key 611 and a [OTHERS] key 612. In the cram school supporting system, a folder named [STUDENT] and a folder named [OTHERS] are generated directly under the root folder. When displaying the application top screen 610, the MFP 101 acquires from the file server 102 information about the folders placed directly under the root folder, and displays the [STUDENT] key 611 and the [OTHERS] key 612 based on the information.

The [STUDENT] key 611 is pressed to upload a document related to each student enrolled in a cram school to the file server 102, and the [OTHERS] key 612 is pressed to upload other documents to the file server 102.

Figure 6B:
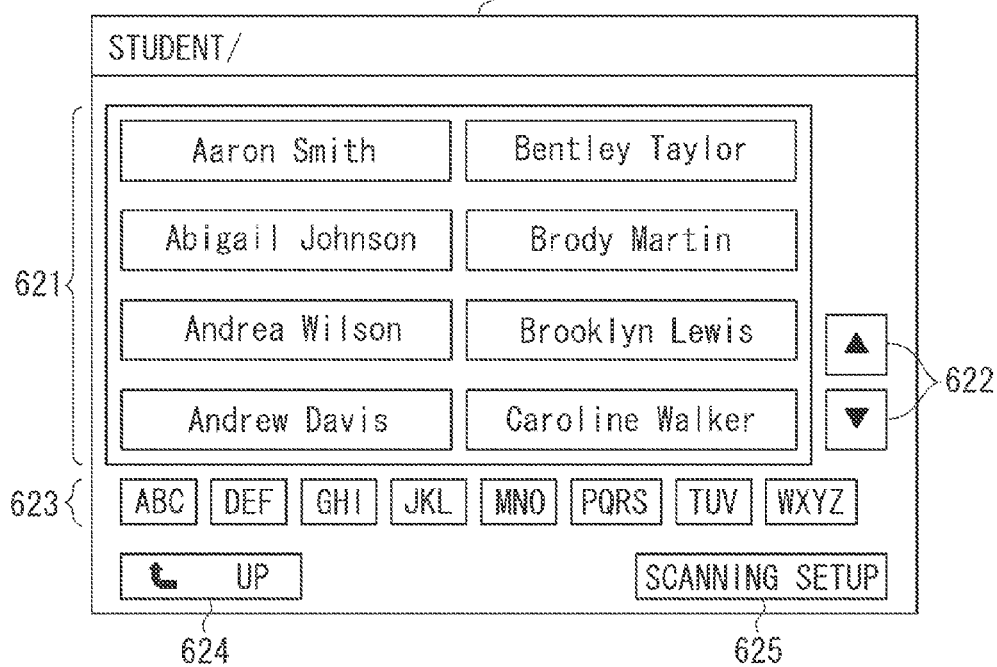

When the [STUDENT] key 611 is pressed, a student list screen 620 illustrated in FIG. 6B is displayed on the operation unit 220. An area 621 displays a list of names of students registered in the cram school supporting system. Directly under the [STUDENT] folder, subfolders having the student name as the folder name are generated corresponding to the number of the students. When displaying the student list screen 620, the MFP 101 acquires from the file server 102 information about the folders placed directly under the [STUDENT] folder, and displays the area 621 based on the information. Each student's folder can be generated and deleted through an operation from the PC (not illustrated). Further, students' folders are alphabetically arranged and displayed by the MFP 101.

Scroll keys 622 are operation keys for scrolling the screen to display in the area 621 student names not currently being displayed in the area 621. An index key group 623 is a group of operation keys for specifying the first character of student names and displaying only relevant student names in the area 621. The [UP] key 624 is an operation key for displaying folders at one higher level. When the [UP] key 624 is pressed, the application top screen 610 is displayed. A [SCANNING SETUP] key 625 is an operation key for displaying a scanning setup screen (described below). When the scanning setup screen is displayed by pressing the [SCANNING SETUP] key 625, image data generated by the scanner 222 is stored in the [STUDENT] folder. When image data storage in the [STUDENT] folder is not permitted, the [SCANNING SETUP] key 625 may not be displayed.

Figure 7A:
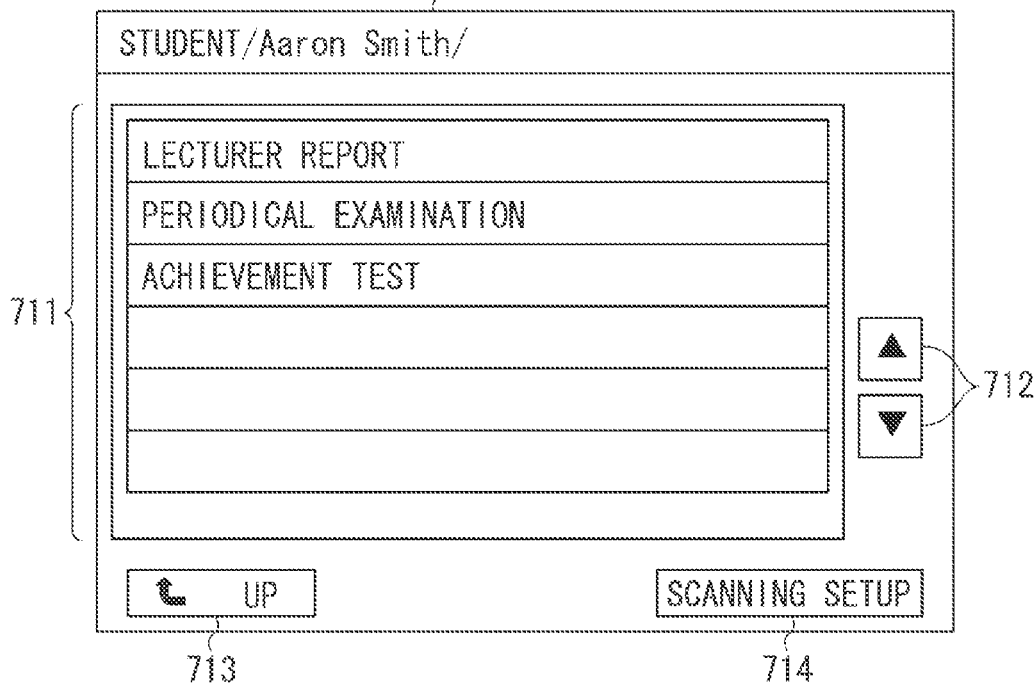
FIGS. 7A and 7B illustrate operation screens of the MFP according to exemplary embodiments of the present invention.

When any operation key included in the area 621 is pressed, a document type list screen 710 illustrated in FIG. 7A is displayed. FIG. 7A illustrates a case where a student named [Aaron Smith] (a folder named [Aaron Smith]) is selected. An area 711 displays a list of document types registered in the cram school supporting system. Directly under the [Aaron Smith] folder, three subfolders having the student name as the folder name are generated. These folders are similarly generated also directly under other students' folders.

When displaying the document type list screen 710, the MFP 101 acquires from the file server 102 information about the folders placed directly under the [Aaron Smith] folder, and displays the area 711 based on the information. Each document type folder can be generated and deleted through an operation from the PC (not illustrated).

Scroll keys 712 are operation keys for scrolling the screen to display in the area 711 document types not currently being displayed in the area 711. Since there are only three folders directly under the [Aaron Smith] folder, all of them are displayed on the screen illustrated in FIG. 7A. If there are seven or more folders, not all of them can be displayed at one time, and therefore the scroll keys 712 are used. Unlike the student list screen 620, the index key group 623 is not displayed on the document type list screen 710. The [UP] key 713 is an operation key for displaying folders at one higher level. When the [UP] key 713 is pressed, the student list screen 620 is displayed. A [SCANNING SETUP] key 714 is an operation key for displaying the scanning setup screen (described below). When the scanning setup screen is displayed by pressing the [SCANNING SETUP] key 714, image data generated by the scanner 222 is stored in the [Aaron Smith] folder.

Figure 7B:
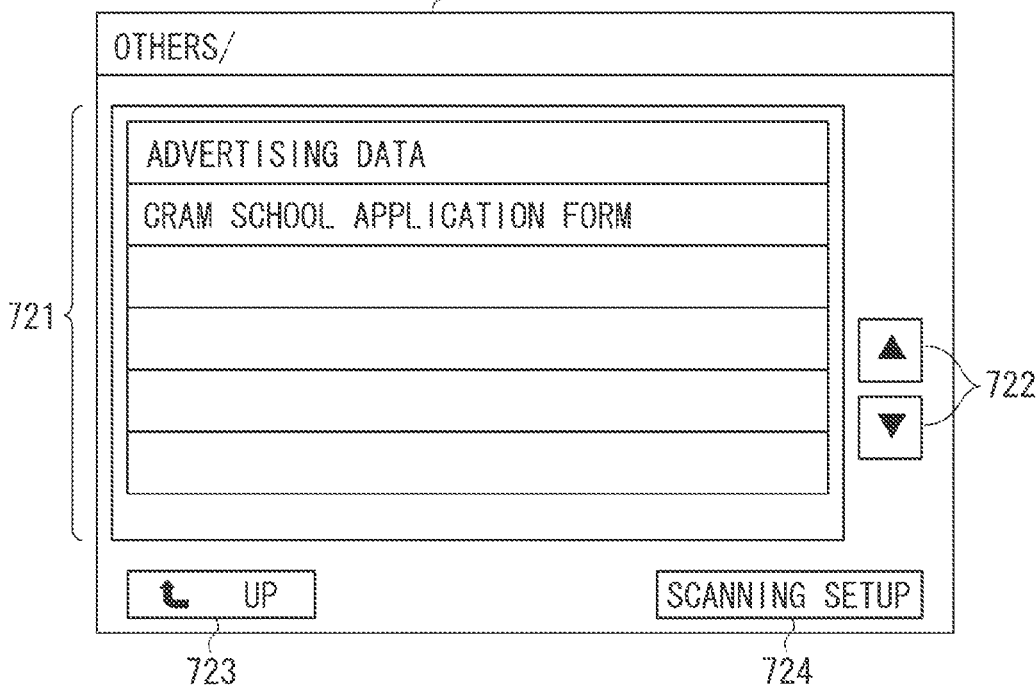

When the [OTHERS] key 612 is pressed on the application top screen illustrated in FIG. 6A, a document type list screen 720 illustrated in FIG. 7B is displayed. An area 721 displays a list of document types registered in the cram school supporting system. Directly under the [OTHERS] folder, two subfolders having the student name as the folder name are generated. When displaying the document type list screen 720, the MFP 101 acquires from the file server 102 information about folders placed directly under the [OTHERS] folder, and displays the area 721 based on the information. Each document type folder can be generated and deleted through an operation from the PC (not illustrated).

Scroll keys 722 are operation keys for scrolling the screen to display in the area 721 document types not currently being displayed in the area 721. Since there are only two folders directly under the [OTHERS] folder, all of them are displayed on the screen illustrated in FIG. 7B. If there are seven or more folders, not all of them can be displayed at one time, and therefore the scroll keys 722 are used. Unlike the student list screen 620, the index key group 623 is not displayed on the document type list screen 720. The [UP] key 723 is an operation key for displaying folders at one higher level. When the [UP] key 723 is pressed, the application top screen 610 is displayed. A [SCANNING SETUP] key 724 is an operation key for displaying the scanning setup screen (described below). When the scanning setup screen is displayed by pressing the [SCANNING SETUP] key 724, image data generated by the scanner 222 is stored in the [OTHERS] folder.

In this case, when the user selects a document type folder displayed on the screens illustrated in FIGS. 7A and 7B, the contents of the selected folder are not displayed but the scanning setup screen (described below) is displayed. This is because the document type folders displayed on the screens illustrated in FIGS. 7A and 7B include no subfolder. In the cram school supporting system described below, no subfolder exists in the document type folders illustrated in FIGS. 7A and 7B since generation of subfolders in the folders is limited. However, in a case where generation of subfolders in the folders is permitted, when a document type folder including at least one subfolder is selected, a subfolder list will be displayed.

Figure 8:
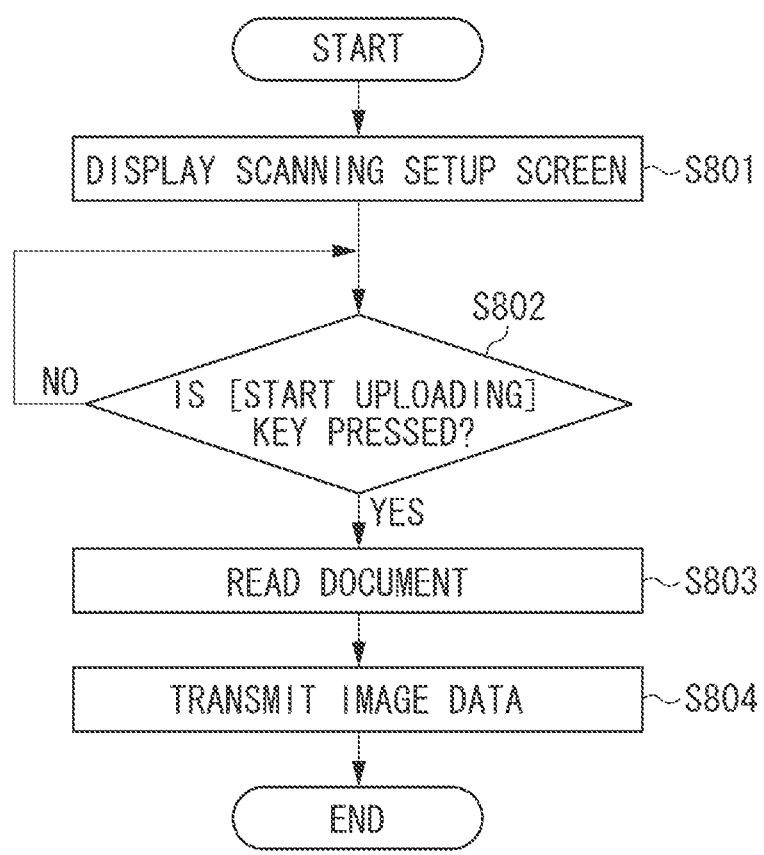
FIG. 8 is a flowchart illustrating operations of the MFP according to exemplary embodiments of the present invention.

FIG. 8 is a flowchart illustrating operations from when the scanning setup screen is displayed until when image data is transmitted to the file server 102. The flowchart illustrated in FIG. 8 is started when any one of the [SCANNING SETUP] keys 625, 714, and 724, or any one of the folders displayed in the areas 711 and 721 is selected. Each operation (step) in the flowchart illustrated in FIG. 8 is implemented when the CPU 211 of the MFP 101 executes a control program stored in the HDD 214.

Figure 9:
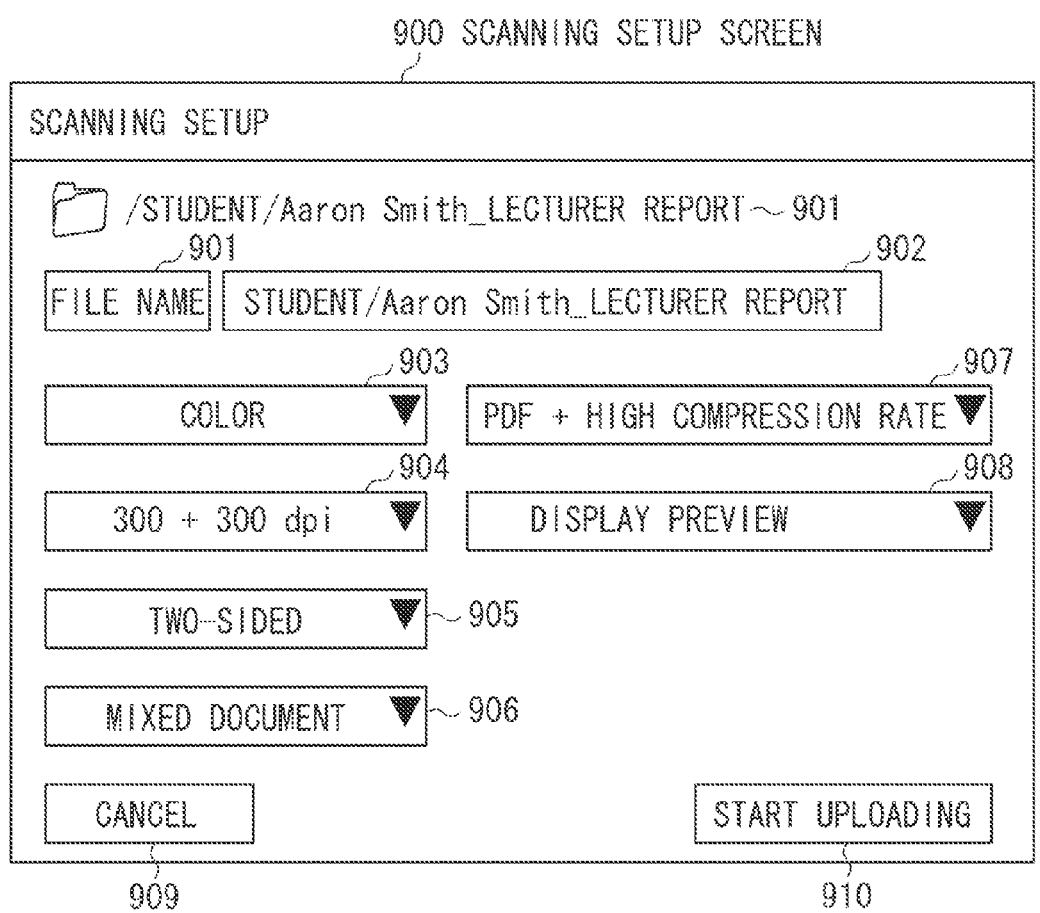
FIG. 9 illustrates an operation screen of the MFP according to exemplary embodiments of the present invention.

In step S801, the CPU 211 displays a scanning setup screen 900 illustrated in FIG. 9. FIG. 9 illustrates a case where a folder named [LECTURER REPORT] placed directly under the [Aaron Smith] folder (a folder of a student named [Aaron Smith]) is selected. An area 901 displays folder path information which indicates the storage destination location of image data generated by the scanner 222. The example illustrated in FIG. 9 indicates that image data will be stored in the [LECTURER REPORT] folder.

A [FILE NAME] key 901 is an operation key for setting a file name of an image data file. When the [FILE NAME] key 901 is pressed, a software keypad is displayed. The user can input any desired character string as a file name. An area 902 displays a default file name setting. More specifically, a character string corresponding to the folder path displayed in the area 901 is displayed as a default file name setting.

Operation keys 903 to 908 are used to set document reading parameters. Reading parameters other than the illustrated ones may be appended, and a part of the illustrated ones may be excluded.

The operation key 903 is a key for setting the color mode. The user can select a desired color mode from pull-down options [COLOR], [GRAY SCALE], and [MONOCHROME]. The operation key 904 is a key for setting the resolution. The user can select a desired resolution from pull-down options such as [300*300 dpi] and [200*200 dpi] (dpi means dot per inch).

The operation key 905 is a key for setting the one-sided reading mode or two-sided reading mode. The user can select a desired reading mode from pull-down options [TWO-SIDED] and [ONE-SIDED]. The operation key 906 is a key for setting the mixed-original mode. The user can select a desired mixed-original mode from pull-down options [MIXED-ORIGINAL] and [NO MIXED-ORIGINAL].

The operation key 907 is a key for setting the file format. The user can select a desired file format from options [TIFF], [PDF], and [PDF+HIGH COMPRESSION RATE] (TIFF means Tag Image File Format, and PDF means Portable Document Format). The operation key 908 is a key for setting the preview display mode. The user can select a desired preview display mode from pull-down options [PREVIEW DISPLAY] and [NO PREVIEW DISPLAY].

When a [CANCEL] key 909 is pressed, the scanning setup operation can be stopped and the storage destination location can be changed to other folders. When a [START UPLOADING] key 910 is pressed, a document is read and image data is transmitted to the file server 102.

Description of FIG. 8 will resume. In step S802, the CPU 211 determines whether the [START UPLOADING] key 910 is pressed. When it is determined that the [START UPLOADING] key 910 is pressed (YES in step S802), the processing proceeds to step S803. On the other hand, when it is determined that the [START UPLOADING] key 910 is not pressed (NO in step S802), the CPU 211 waits until the relevant key is pressed.

In step S803, the CPU 211 reads a document via the scanner 222, and generates image data according to the setting made via the scanning setup screen. In step S804, the CPU 211 transmits the image data to the file server 102.

Figure 10:
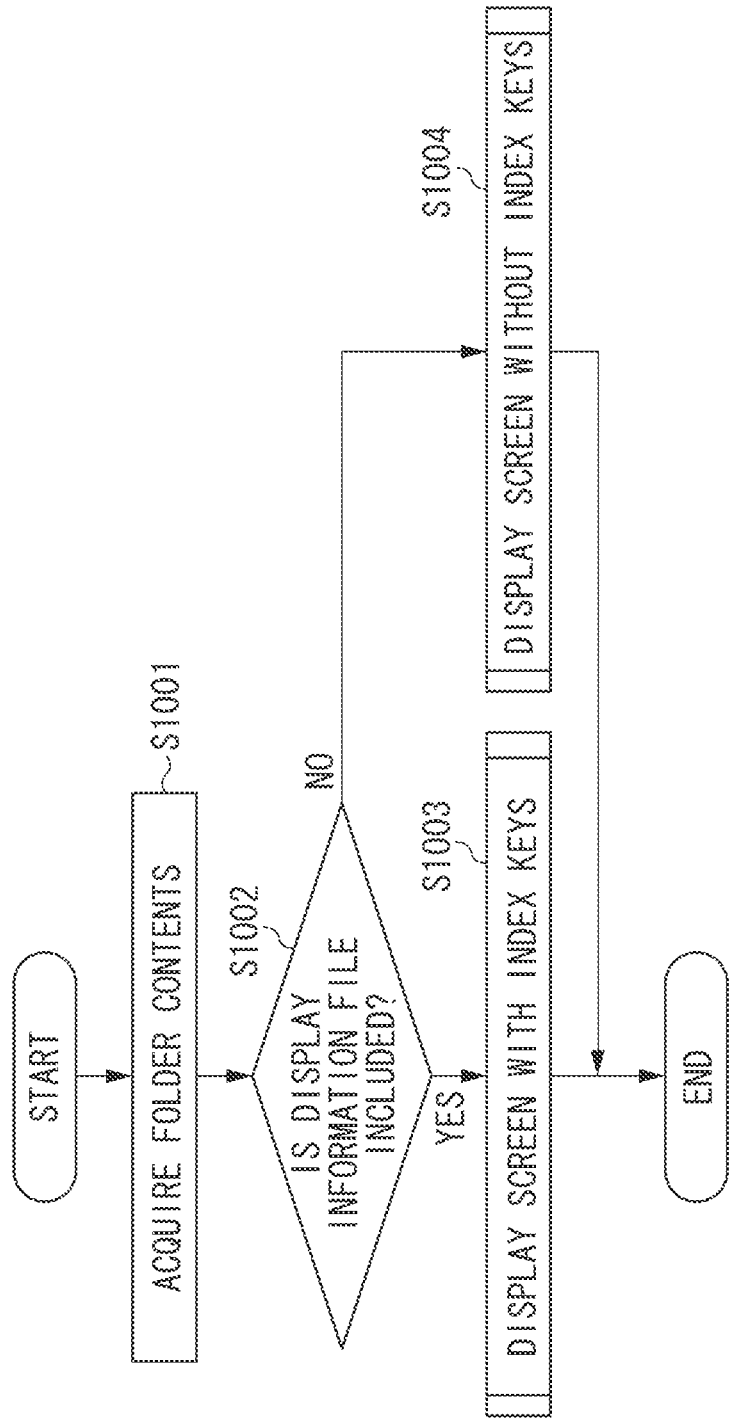
FIG. 10 is a flowchart illustrating operations of the MFP according to exemplary embodiments of the present invention.

Operations for displaying the student list screen 620 illustrated in FIG. 6B, the document type list screen 710 illustrated in FIG. 7A, and the document type list screen 720 illustrated in FIG. 7B will be described in detail below with reference to the flowchart illustrated in FIG. 10. Each operation (step) in the flowchart illustrated in FIG. 10 is implemented when the CPU 211 of the MFP 101 executes a control program stored in the HDD 214.

In step S1001, the CPU 211 acquires the contents of a display target folder (information about subfolders and files placed directly under the display target folder). When displaying the student list screen 620, the [STUDENT] folder is a display target folder. When displaying the document type list screen 710, each student's folder (for example, the [Aaron Smith] folder) is a display target folder. When displaying the document type list screen 720, the [OTHERS] folder is a display target folder.

In step S1002, the CPU 211 determines whether a display information file is included in the acquired contents. The display information file is particularly provided to determine the layout of the screen for displaying a list of folders. This file is assigned a file name [dispinfo] which indicates that it is a display information file. A leading period [.] may be appended to the file name. The appended period [.] enables the file to be handled as a hidden file on the file server 102, preventing the file from being operated by general users. Instead of performing the determination in step S1002 depending on whether there exists the display information file, the CPU 211 may perform the determination based on the contents of the display information file.

When it is determined that the display information file is included (YES in step S1002), the processing proceeds to step S1003. On the other hand, when it is determined that the display information file is not included (NO in step S1002), the processing proceeds to step S1004. Step S1003 will be described in detail below with reference to FIGS. 11 to 16. Step S1004 will be described in detail below with reference to FIGS. 17 and 18.

Figure 11:
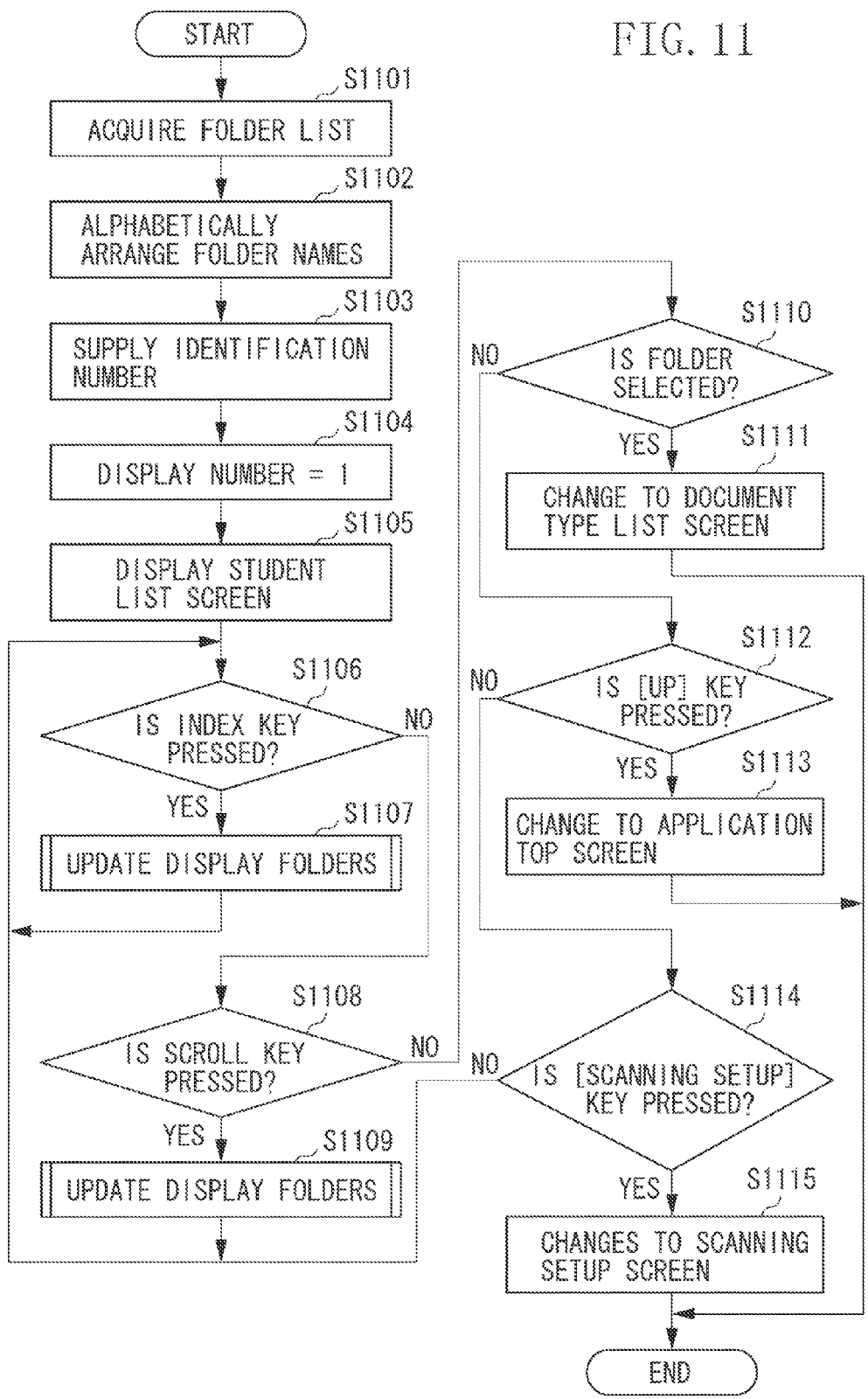
FIG. 11 is a flowchart illustrating operations of the MFP according to exemplary embodiments of the present invention.

The flowchart illustrated in FIG. 11 indicates the processing for displaying the student list screen 620 illustrated in FIG. 6B, and the processing to be performed in response to a user operation made on the student list screen 620. In the following example, the student list screen 620 is displayed with the index key group 623 on the premise that the display information file is placed directly under the [STUDENT] folder. The index key group 623 is not displayed on the student list screen 620 if the display information file is not placed directly under the [STUDENT] folder. Each operation (step) in the flowchart illustrated in FIG. 11 is implemented when the CPU 211 of the MFP 101 executes a control program stored in the HDD 214.

In step S1101, the MFP 101 acquires from the file server 102 information about folders placed directly under the [STUDENT] folder (a folder list including folder names). Instead of acquiring the information from the file server 102, the CPU 211 may use the information acquired in step S1001. In step S1102, the CPU 211 alphabetically arranges the acquired folder names. In step S1103, the CPU 211 supplies the identification number (identification information) to the alphabetically arranged folders.

FIG. 12 illustrates a folder list 1200 which has undergone the processing up to step S1103. Folders assigned a student name are arranged by student name from the top downward, and are supplied with the identification number in order of student name.

In step S1104, the CPU 211 determines identification number [1] as the display number. The display number serves as a reference for determining the folders to be displayed in the area 621. The folder corresponding to the identification number determined as the display number, and folders corresponding to the subsequent 7 identification numbers are displayed in the area 621. For example, when identification number [1] is determined as the display number, 8 folders corresponding to identification numbers [1] to [8] are displayed in the area 621. In step S1105, the CPU 211 extracts 8 folders corresponding to identification number [1] (determined as the display number in step S1104) and subsequent 7 identification numbers, and displays the student list screen 620 in which the extracted folders are arranged in the area 621. Although, in this example, 8 folders are displayed at one time, any number of folders may be displayed depending on the screen size.

In step S1106, the CPU 211 determines whether any index key included in the index key group 623 is pressed. When it is determined that an index key is pressed (YES in step S1106), the processing proceeds to step S1107. On the other hand, when it is determined that no index key is pressed (NO in step S1106), the processing proceeds to step S1108. In step S1107, the CPU 211 performs processing for updating the folders to be displayed in the area 621. Step S1107 will be described in detail below with reference to FIG. 13.

In step S1108, the CPU 211 determines whether one of the scroll keys 622 is pressed. When it is determined that one of the scroll keys 622 is pressed (YES in step S1108), the processing proceeds to step S1109. On the other hand, when it is determined that none of the scroll keys 622 is pressed (NO in step S1108), the processing proceeds to step S1110. In step S1109, the CPU 211 performs processing for updating the folders to be displayed in the area 621. Step S1109 will be described in detail below with reference to FIG. 16.

In step S1110, the CPU 211 determines whether any one of the folders displayed in the area 621 is selected. When it is determined that a folder is selected (YES in step S1110), the processing proceeds to step S1111. On the other hand, when it is determined that no folder is selected (NO in step S1110), the processing proceeds to step S1112. In step S1111, the CPU 211 changes the screen to the document type list screen 710 illustrated in FIG. 7A.

In step S1112, the CPU 211 determines whether the [UP] key 624 is pressed. When it is determined that the [UP] key 624 is pressed (YES in step S1112), the processing proceeds to step S1113. On the other hand, when it is determined that the [UP] key 624 is not pressed (NO in step S1112), the processing proceeds to step S1114. In step S1113, the CPU 211 changes the screen of the operation unit 220 to the application top screen 610 illustrated in FIG. 6A.

In step S1114, the CPU 211 determines whether the [SCANNING SETUP] key 625 is pressed. When it is determined that the [SCANNING SETUP] key 625 is pressed (YES in step S1114), the processing proceeds to step S1115. On the other hand, when it is determined that the [SCANNING SETUP] key is not pressed (NO in step S1114), the processing returns to step S1106. In step S1115, the CPU 211 changes the screen of the operation unit 220 to the scanning setup screen 900 illustrated in FIG. 9.

Figure 13:
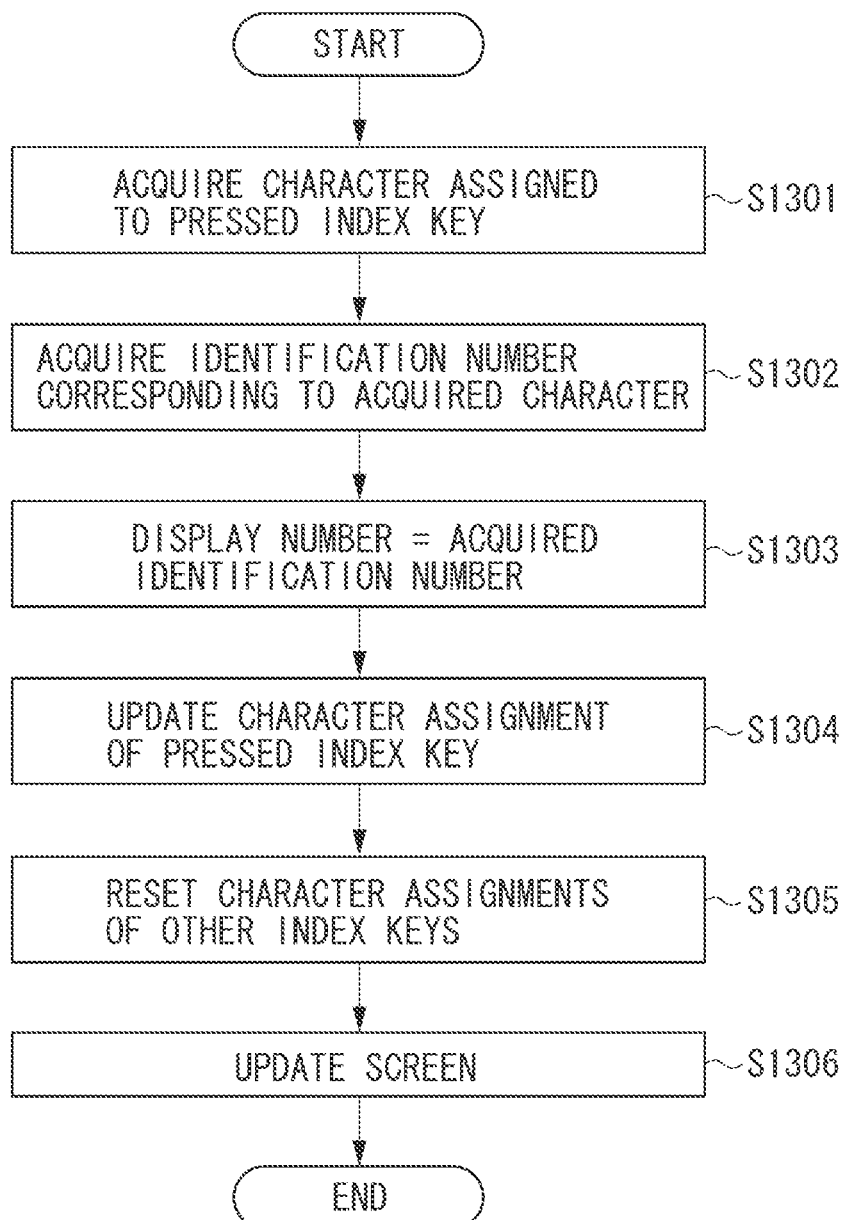
FIG. 13 is a flowchart illustrating operations of the MFP according to exemplary embodiments of the present invention.
Figure 14:
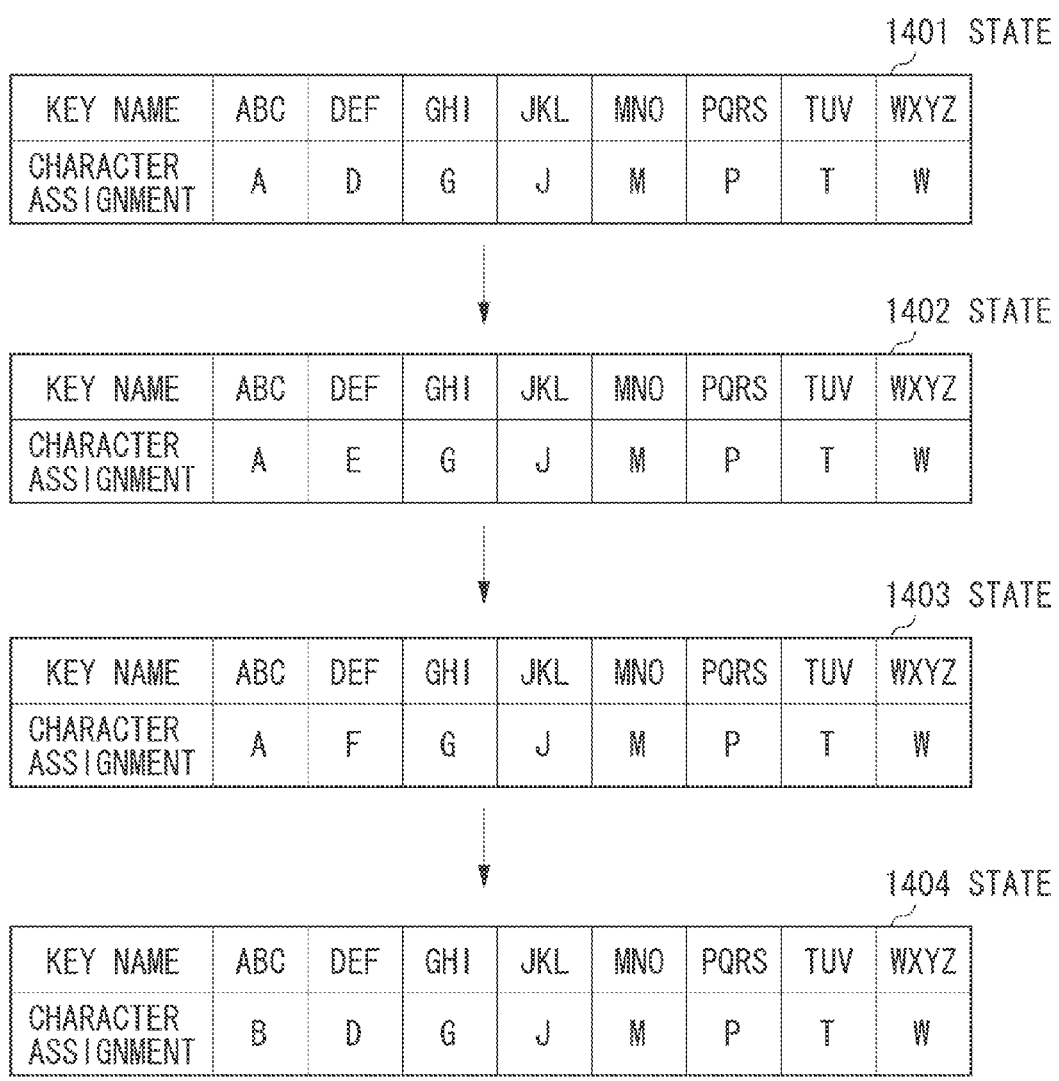
FIG. 14 illustrates how a state of character assignment transitions according to exemplary embodiments of the present invention.

FIG. 13 is a flowchart illustrating in detail the processing in step S1107 illustrated in FIG. 11. Each operation (step) in the flowchart illustrated in FIG. 13 is implemented when the CPU 211 of the MFP 101 executes a control program stored in the HDD 214.

In step S1301, the CPU 211 acquires a character assigned to a pressed index key out of the index keys included in the index key group 623. Each index key included in the index key group 623 is assigned a character as an initial value (a state 1401) illustrated in FIG. 14. In the state 1401, when an index key named [DEF] is pressed, the CPU 211 acquires character [D].

In step S1302, the CPU 211 acquires identification numbers corresponding to the character acquired in step S1301. Specifically, the CPU 211 identifies from the folder list 1200 folder names having the character acquired in step S1301 as the first character, and acquires the identification number corresponding to the folder name at the highest position (the smallest identification number) out of the identified folder names. If the character acquired in step S1301 is [D], the CPU 211 identifies [David Sanchez], and acquires identification number [11].

In step S1303, the CPU 211 determines the identification number acquired in step S1302 as the display number. In step S1304, the CPU 211 updates the character assignment to the pressed index key. Specifically, when the [DEF] key to which character [D] is assigned is pressed, character [E] (the character following [D]) is assigned to the relevant key.

In step S1305, the CPU 211 returns to the initial state the character assignments to index keys other than the pressed index key. When the [DEF] key is pressed in the state 1401, index keys other than the [DEF] key are in the initial state. Therefore, when a comparison is made between the states 1401 and 1402, the character assignments to index keys other than the [DEF] key remain unchanged.

Figure 15A:
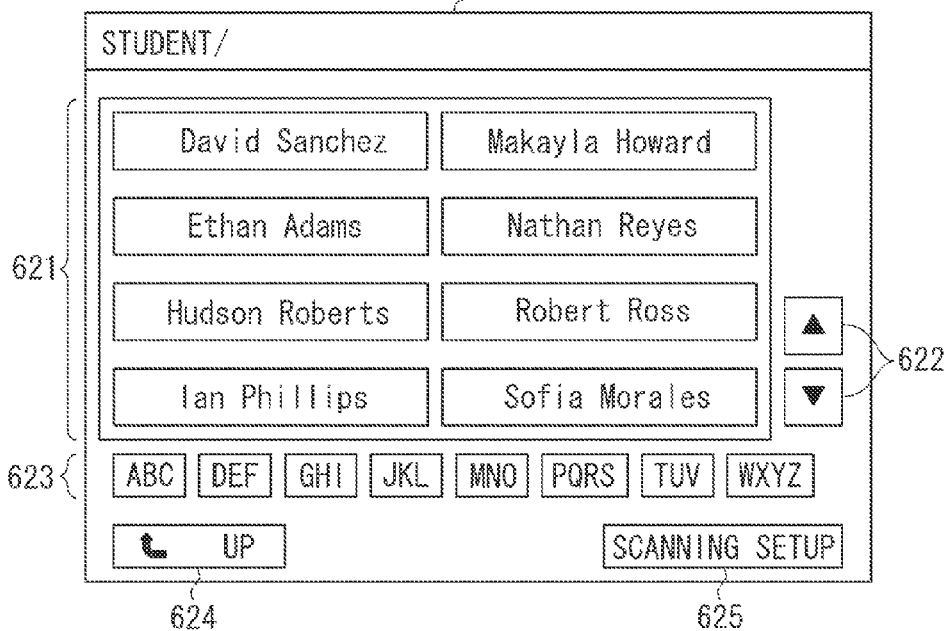
FIGS. 15A and 15B illustrate operation screens of the MFP according to exemplary embodiments of the present invention.

In step S1306, the CPU 211 sequentially extracts folders starting from the identification information determined as the display number in step S1303, and displays the student list screen 620 in which the extracted folders are arranged in the area 621. The screen displayed here is illustrated in FIG. 15A. FIG. 15A indicates that the area 621 displays 8 folders ranging from [David Sanchez] corresponding to identification number [11] to [Sofia Morales] corresponding to identification number [18].

The following describes a case where the [DEF] key is pressed again in the state 1402. In step S1301, the CPU 211 acquires character [E] assigned to the [DEF] key. In step S1302, the CPU 211 identifies folder names having character [E] as the first character from the folder list 1200, and acquires identification number [12] corresponding to [Ethan Adams] at the highest position out of the identified folder names.

In step S1303, the CPU 211 updates the character assignment to the [DEF] key from [E] to [F]. In step S1304, the CPU 211 returns to the initial state the character assignments to index keys other than the [DEF] key. When the [DEF] key is pressed in the state 1402, index keys other than the [DEF] key are reset to the initial state. Therefore, when a comparison is made between the states 1402 and 1403, the character assignments to index keys other than the [DEF] key remain unchanged. As a result of the above-described processing, the character assignment to each index key changes as illustrated in the state 1403.

Figure 15B:
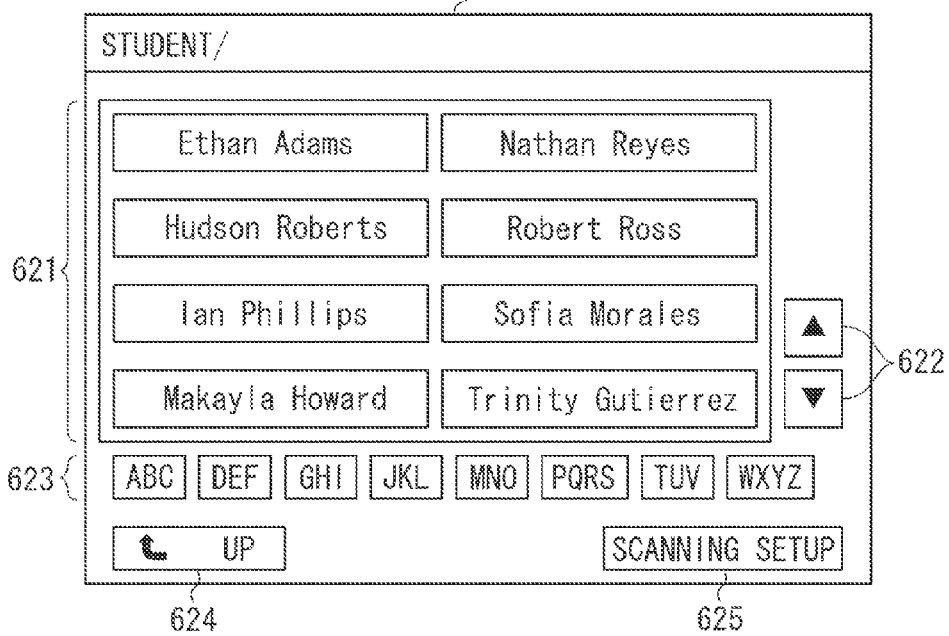

In step S1306, the CPU 211 sequentially extracts 8 folders from identification information [12] determined as the display number in step S1303, and displays the student list screen 620 in which the extracted folders are arranged in the area 621. The screen displayed is illustrated in FIG. 15B. FIG. 15B indicates that the area 621 displays 8 folders ranging from [Ethan Adams] corresponding to identification number [12] to [Trinity Gutierrez] corresponding to identification number [19].

The following describes a case where the [ABC] key is pressed in the state 1403. In step S1301, the CPU 211 acquires character [A] assigned to the [ABC] key. In step S1302, the CPU 211 identifies folder names having character [A] as the first character from the folder list 1200, and acquires identification number [1] corresponding to [Aaron Smith] at the highest position out of the identified folder names.

In step S1303, the CPU 211 updates the character assignment to the [ABC] key from [A] to [B]. In step S1304, the CPU 211 returns to the initial state the character assignments to index keys other than the [ABC] key. When the [ABC] key is pressed in the state 1403 in which character [F] is assigned to the [DEF] key, the CPU 211 performs processing for returning the key assignment to the [DEF] key to the initial state ([D]). As the result of the above-described processing, the character assignments to the index keys change as illustrated in a state 1404.

In step S1306, the CPU 211 extracts 8 folders sequentially from identification information [1] determined as the display number in step S1303, and displays the student list screen 620 in which the extracted folders are arranged in the area 621. The screen displayed in this case is the same as the screen illustrated in FIG. 6B. FIG. 6B shows that the area 621 displays 8 folders ranging from [Aaron Smith] corresponding to identification number [1] to [Caroline Walker] corresponding to identification number [8].

Figure 16:
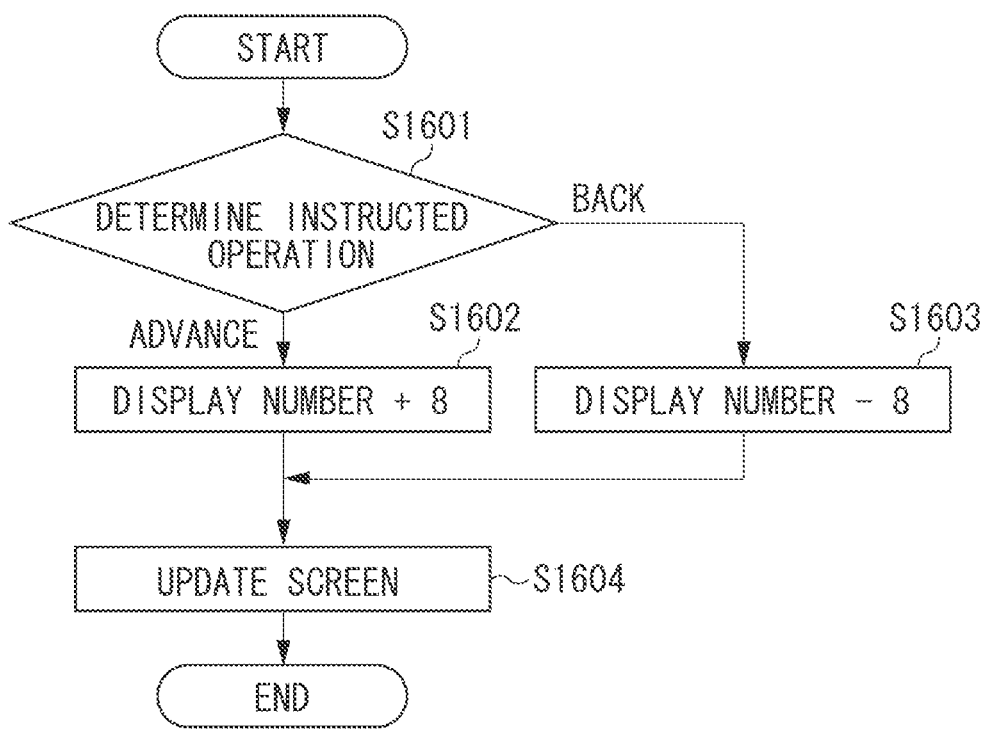
FIG. 16 is a flowchart illustrating operations of the MFP according to exemplary embodiments of the present invention.

FIG. 16 is a flowchart illustrating in detail the processing in step S1109 of FIG. 11. Each operation (step) in the flowchart illustrated in FIG. 16 is implemented when the CPU 211 of the MFP 101 executes a control program stored in the HDD 214.

In step S1601, the CPU 211 determines the operation instructed by the pressed scroll key 622. When it is determined that the scroll key 622 having the down-arrow mark is operated, the CPU 211 determines that an advancing operation is instructed (ADVANCE in step S1601), and advances the processing to step S1602. On the other hand, when it is determined that the key 622 having the up-arrow mark is operated, the CPU 211 determines that a backing operation is instructed (BACK in step S1601), and advances the processing to step S1603.

In step S1602, the CPU 211 increments the value of the current display number by 8. Although, in this case, the value of the display number is incremented by 8 since 8 folders can be displayed at one time, the value may be incremented by other numbers.

In step S1603, the CPU 211 decrements the value of the current display number by 8. Although, in this case, the value of the display number is decremented by 8 since 8 folders can be displayed at one time, the value may be decremented by other numbers. Further, if the value of the display number falls below 1 as a result of decrementing the value by 8, the CPU 211 determines identification number [1] as the display number.

In step S1604, the CPU 211 sequentially extracts folders starting from the identification information determined as the display number in step S1602 or S1603, and displays the student list screen 620 in which the extracted folders are arranged in the area 621.

As described above, when opening a folder directly under which the display information file is placed (when displaying a list of folders placed directly under the same folder as the folder storing the display information file), a screen having index keys is displayed. When many folders are placed in the same place or when folder names are meaningful (folders are assigned names easily selectable by using index keys), it is possible to easily display a screen having index keys by placing the display information file.

Figure 17:
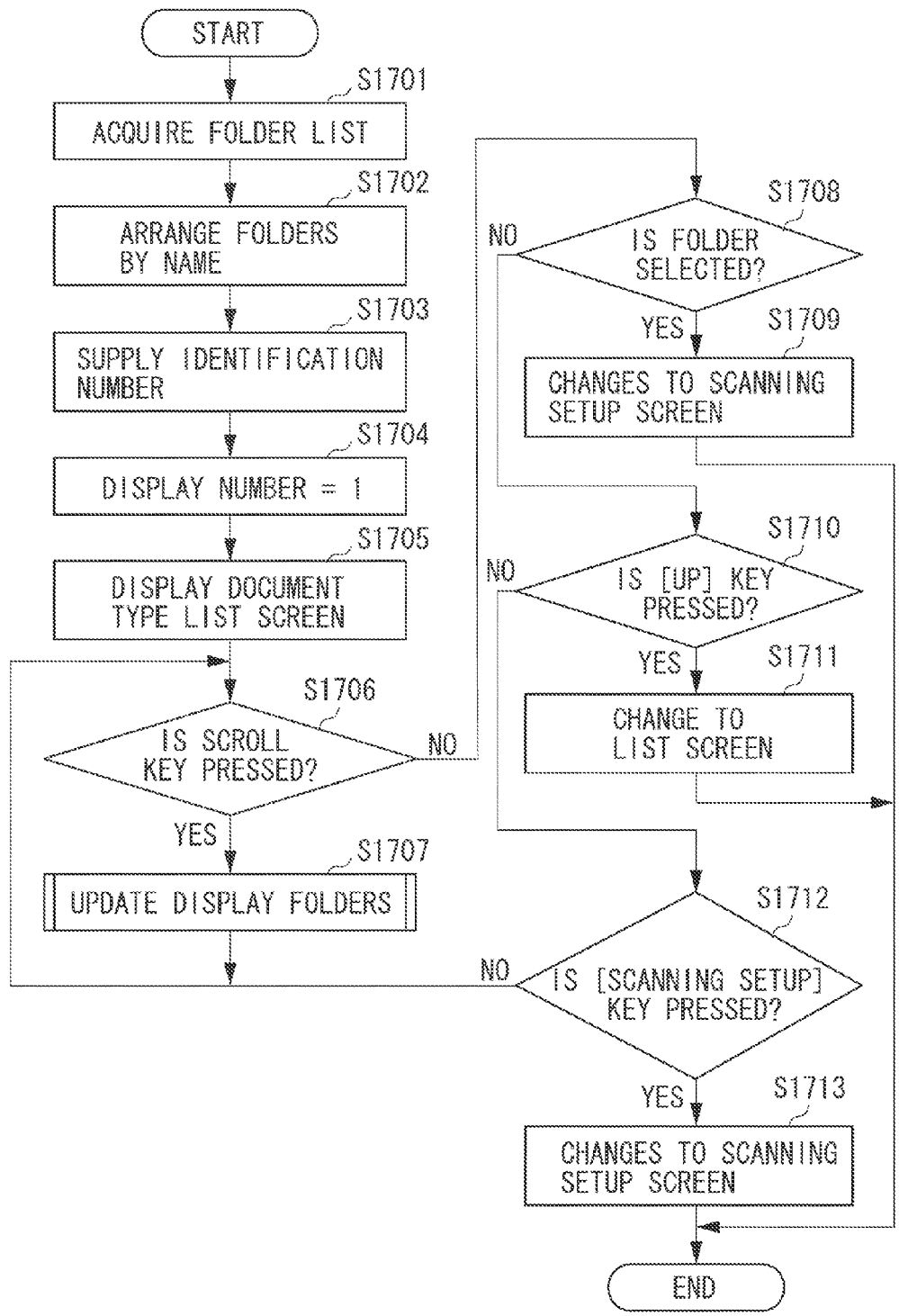
FIG. 17 is a flowchart illustrating operations of the MFP according to exemplary embodiments of the present invention.

The flowchart illustrated in FIG. 17 indicates the processing for displaying the document type list screen 710 illustrated in FIG. 7A, and the processing to be performed in response to a user operation made on the document type list screen 710. The following describes a case where the document type list screen 710 is displayed without index keys on the premise that the display information file is not placed directly under the [Aaron Smith] folder. However, if the display information file is placed, index keys are displayed on the document type list screen 710. Each operation (step) in the flowchart illustrated in FIG. 17 is implemented when the CPU 211 of the MFP 101 executes a control program stored in the HDD 214.

In step S1701, the MFP 101 acquires from the file server 102 information about folders placed directly under the [Aaron Smith] folder (a folder list including folder names). In this case, instead of acquiring information from the file server 102 again, the CPU 211 may use the information acquired in step S1001. In step S1702, the CPU 211 arranges the acquired folders by name. In step S1703, the CPU 211 supplies the identification number (identification information) to each of the folders arranged by name.

In step S1704, the CPU 211 determines identification number [1] as the display number. In step S1705, the CPU 211 extracts 6 folders sequentially from identification number [1] determined as the display number in step S1704, and displays the document type list screen 710 in which the extracted folders are arranged in the area 711. Although, in this example, 6 folders are displayed at one time, any number of folders may be displayed depending on the screen size.

In step S1706, the CPU 211 determines whether one of the scroll keys 712 is pressed. When it is determined that one of the scroll keys 712 is pressed (YES in step S1706), the processing proceeds to step S1707. On the other hand, when it is determined that none of the scroll keys 712 is pressed (NO in step S1706), the processing proceeds to step S1708. In step S1707, the CPU 211 performs processing for updating the folders to be displayed in the area 711. Step S1707 will be described in detail below with reference to FIG. 18.

In step S1708, the CPU 211 determines whether any one of the folders displayed in the area 711 is selected. When it is determined that a folder is selected (YES in step S1708), the processing proceeds to step S1709. On the other hand, when no folder is selected (NO in step S1708), the processing proceeds to step S1710. In step S1709, the CPU 211 changes the screen to the scanning setup screen 900 illustrated in FIG. 9.

In step S1710, the CPU 211 determines whether the [UP] key 713 is pressed. When it is determined that the [UP] key 713 is pressed (YES in step S1710), the processing proceeds to step S1711. On the other hand, when the [UP] key is not pressed (NO in step S1710), the processing proceeds to step S1712. In step S1711, the CPU 211 changes the screen of the operation unit 220 to the student list screen 620 illustrated in FIG. 6B.

In step S1712, the CPU 211 determines whether the [SCANNING SETUP] key 714 is pressed. When it is determined that the [SCANNING SETUP] key 714 is pressed (YES in step S1712), the processing proceeds to step S1713. On the other hand, when the [SCANNING SETUP] key is not pressed (NO in step S1712), the processing returns to step S1706. In step S1713, the CPU 211 changes the screen of the operation unit 220 to the scanning setup screen 900 illustrated in FIG. 9.

The processing for displaying the document type list screen 720 illustrated in FIG. 7B, and the processing to be performed in response to a user operation made on the document type list screen 720 are also performed in a way similar to the flowchart illustrated in FIG. 17. In this case, the screen in step S1711 changes not to the student list screen 620 but to the application top screen 610.

Figure 18:
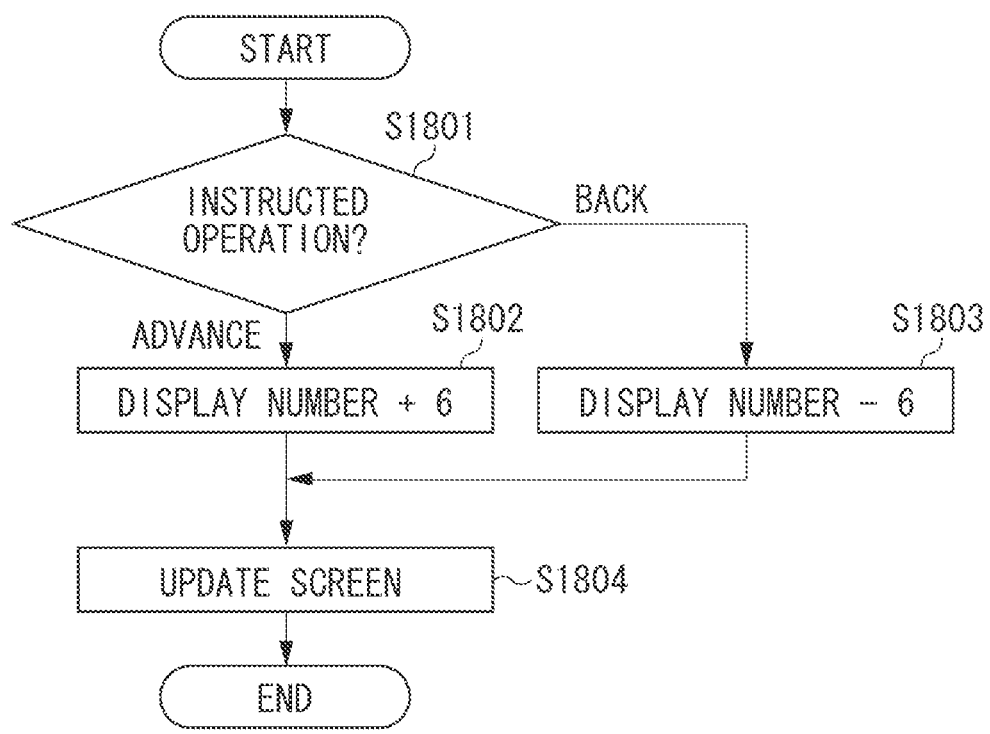
FIG. 18 is a flowchart illustrating operations of the MFP according to exemplary embodiments of the present invention.

FIG. 18 is a flowchart illustrating in detail the processing in step S1707 of FIG. 17. Each operation (step) in the flowchart illustrated in FIG. 18 is implemented when the CPU 211 of the MFP 101 executes a control program stored in the HDD 214.

In step S1801, the CPU 211 determines the operation instructed by the pressed scroll key 712. When it is determined that the scroll key 712 having the down-arrow mark is operated, the CPU 211 determines that an advancing operation is instructed (ADVANCE in step S1801), and advances the processing to step S1802. On the other hand, when the key 712 having the up-arrow mark is operated, the CPU 211 determines that a backing operation is instructed (BACK in step S1801), and advances the processing to step S1803.

In step S1802, the CPU 211 increments the value of the current display number by 6. Although, in this case, the value of the display number is incremented by 6 since 6 folders can be displayed at one time, the value may be incremented by other numbers.

In step S1803, the CPU 211 decrements the value of the current display number by 6. Although, in this case, the value of the display number is decremented by 6 since 6 folders can be displayed at one time, the value may be decremented by other numbers. Further, if the value of the display number falls below 1 as a result of decrementing the value by 6, the CPU 211 determines identification number [1] as the display number.

In step S1804, the CPU 211 sequentially extracts folders starting from the identification information determined as the display number in step S1802 or S1803, and displays the document type list screen 710 in which the extracted folders are arranged in the area 711.

As described above, when opening a folder directly under which the display information file is not placed (when displaying a list of folders placed directly under the folder directly under which the display information file is not placed), a screen not having index keys is displayed. Thus, it is possible to allocate a wider area for displaying a folder list than in a case where index keys are displayed. Specifically, FIGS. 6 and 7 show that the areas 711 and 721 are larger than the area 621. Thus, the areas 711 and 721 can display folder names having a larger number of characters (although less number of folders) than the area 621. This makes it easier to recognize a folder having a long folder name. When it is not necessary to display many characters, the number of characters to be displayed in the areas 711 and 721 may be equalized to that in the area 621, allowing more folders to be displayed than in the area 621.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193036 filed Sep. 18, 2013, which is hereby incorporated by reference herein in its entirety.

What is claimed is:

1. An information processing system comprising:
a management unit configured to manage a plurality of folders;
a display unit configured to display a screen including a list of a part of folders included in the plurality of folders;
a determination unit configured to determine to, based on a file stored in a same folder as a folder storing the plurality of folders, display index keys for enabling display of folders corresponding to a specified character out of the plurality of folders; and
a display control unit configured to, in a case where the determination unit determines to display the index keys, display the screen including the index keys on the display unit, and to, in a case where the determination unit does not determine to display the index keys, display the screen not including the index keys on the display unit.

2. The information processing system according to claim 1, further comprising:
a reading unit configured to read an image on a document to generate image data; and
a storage unit configured to store the image data generated by the reading unit in a folder selected by a user via the screen.

3. The information processing system according to claim 1, wherein, names of the plurality of folders are described in Chinese characters,
wherein the file includes information indicating kana of the folder name indicating pronunciation, and
wherein the index keys enable specifying the first character of the kana of the folder name indicating pronunciation.

4. The information processing system according to claim 3, wherein the list of folders arranges and displays folders in order based on the information indicating the kana indicating the pronunciation included in the file.

5. The information processing system according to claim 1, wherein the management unit is stored in a file server, and
wherein the display unit, the determination unit, and the display control unit are included in an information processing apparatus for communicating with the file server via a network.

6. An information processing apparatus comprising:
a display unit configured to display a screen including a list of a part of folders included in a plurality of folders;
a determination unit configured to determine to, based on a file stored in a same folder as a folder storing the plurality of folders, display index keys for enabling display of folders corresponding to a specified character out of the plurality of folders; and
a display control unit configured to, in a case where the determination unit determines to display the index keys, display the screen including the index keys on the display unit, and to, in a case where the determination unit does not determine to display the index keys, display the screen not including the index keys on the display unit.

7. The information processing apparatus according to claim 6, further comprising:
a management unit configured to manage the plurality of folders.

8. The information processing apparatus according to claim 6, further comprising:
a communication unit configured to communicate with a file server managing the plurality of folders.

9. The information processing apparatus according to claim 6, further comprising:
a reading unit configured to read an image on a document to generate image data,
wherein the image data generated by the reading unit is stored in a folder selected by a user via the screen.

10. An information processing method comprising:
managing a plurality of folders;
displaying a screen including a list of a part of folders included in the plurality of folders;
determining to, based on a file stored in a same folder as a folder storing the plurality of folders, display index keys for enabling display of folders corresponding to a specified character out of the plurality of folders; and
performing display control to, in a case where it is determined to display the index keys, display the screen including the index keys, and to, in a case where the index keys are determined not to be displayed, display the screen not including the index keys.

11. An information processing method comprising:
displaying a screen including a list of a part of folders included in a plurality of folders;
determining to, based on a file stored in a same folder as a folder storing the plurality of folders, display index keys for enabling display of folders corresponding to a specified character out of the plurality of folders; and
performing display control to, in a case where it is determined to display the index keys, display the screen including the index keys, and to, in a case where it is determined that the index keys are not to be displayed, display the screen not including the index keys.

12. A non-transitory computer-readable storage medium storing a program for causing a computer to execute the method defined by claim 10.

13. A non-transitory computer-readable storage medium storing a program for causing a computer to execute the method defined by claim 11.

* * * * *